Feb. 28, 1967 E. R. KOLB 3,307,172
ENCODER METHODS AND APPARATUS
Filed June 11, 1963 10 Sheets-Sheet 2
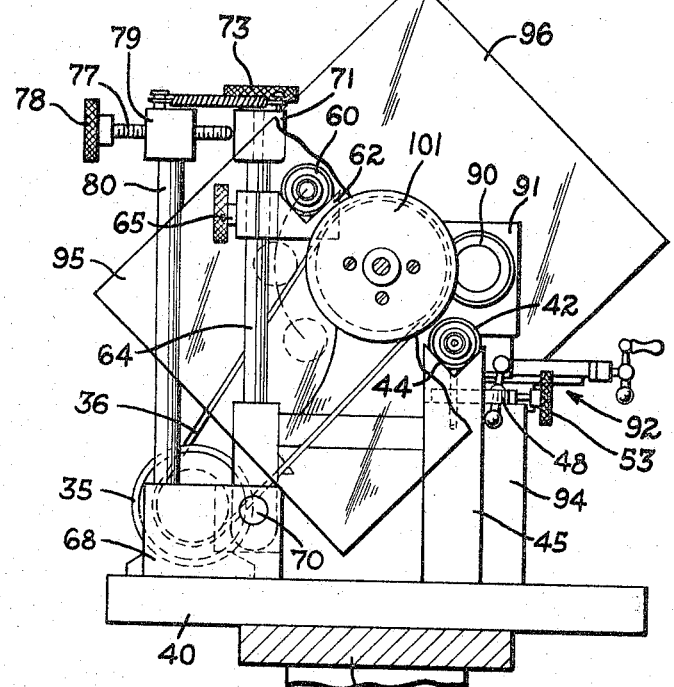
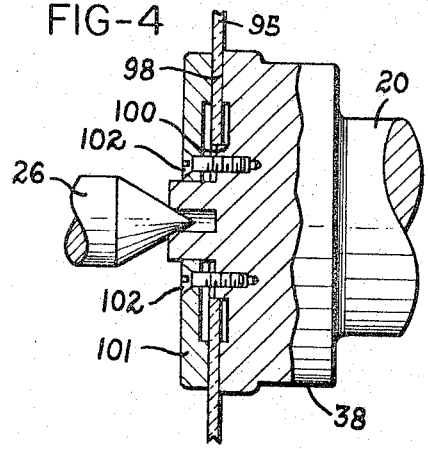
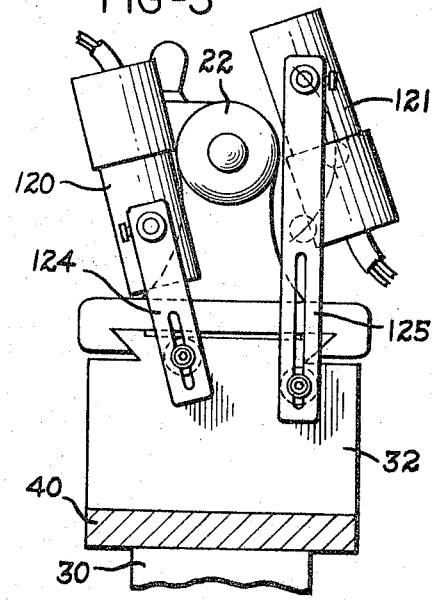
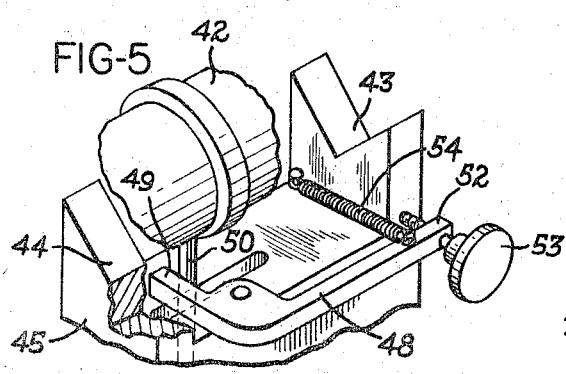
INVENTOR.
EDWIN R. KOLB
BY
Marechal, Biebel, French & Bugg
ATTORNEYS Feb. 28, 1967 E. R. KOLB 3,307,172
ENCODER METHODS AND APPARATUS
Filed June 11, 1963 10 Sheets-Sheet 4

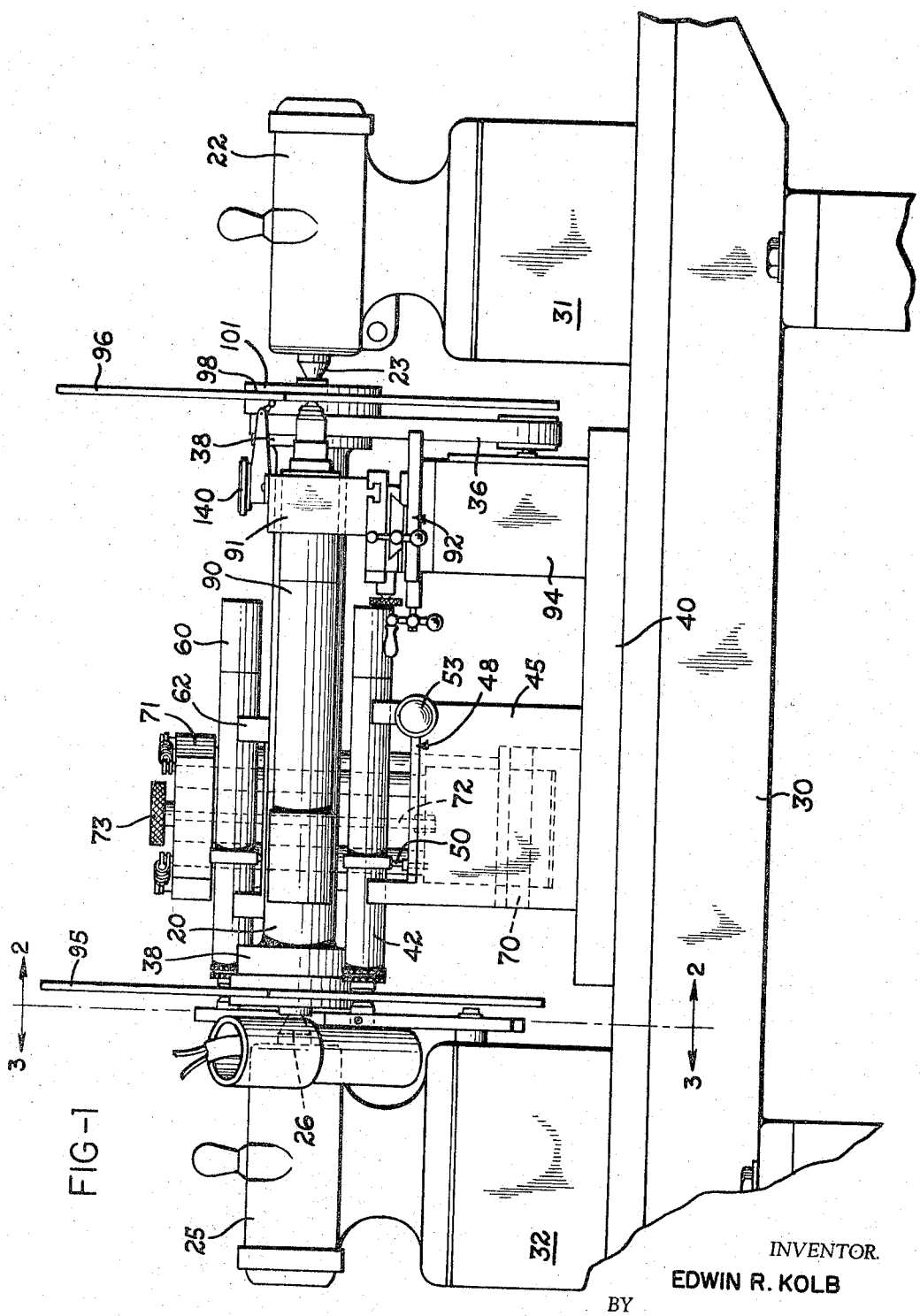

INVENTOR.
EDWIN R. KOLB
BY
Maréchal, Biebel, French & Bugg
ATTORNEYS

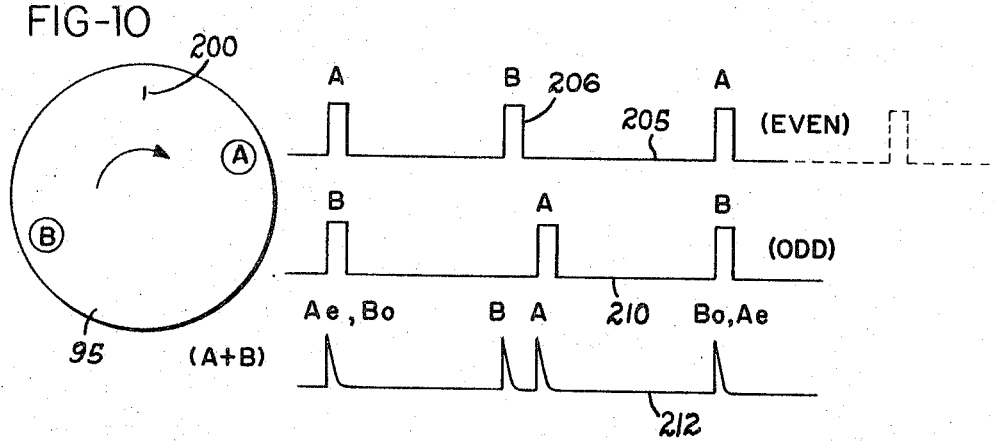
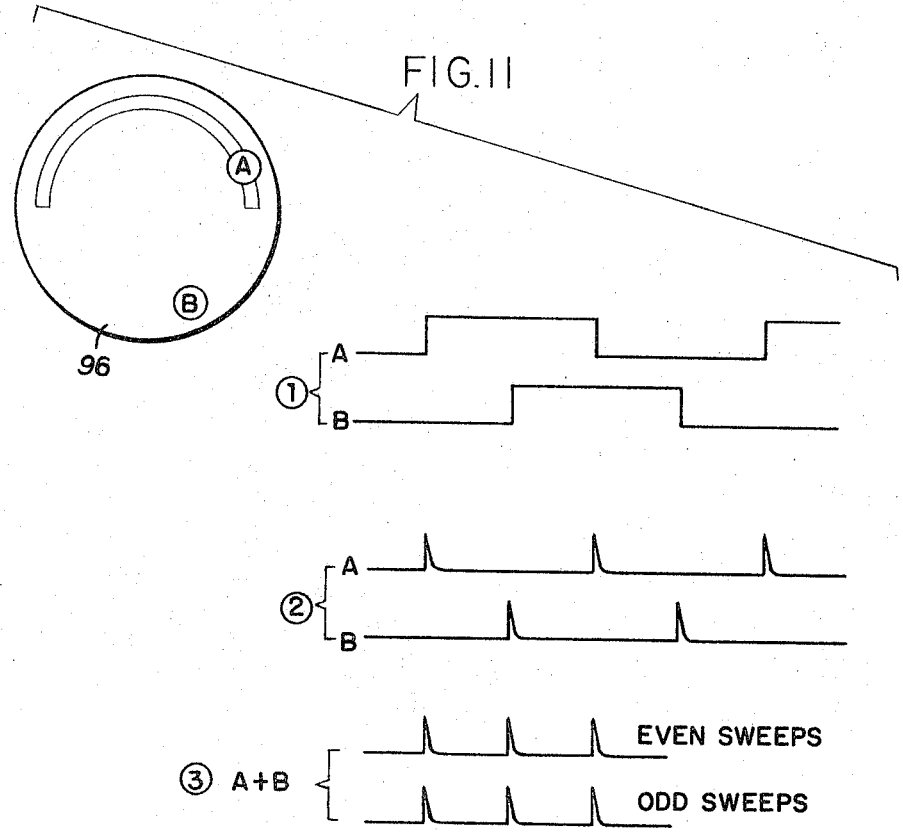

Feb. 28, 1967　　　　　E. R. KOLB　　　　　3,307,172
ENCODER METHODS AND APPARATUS
Filed June 11, 1963　　　　　　　　　　　10 Sheets-Sheet 6
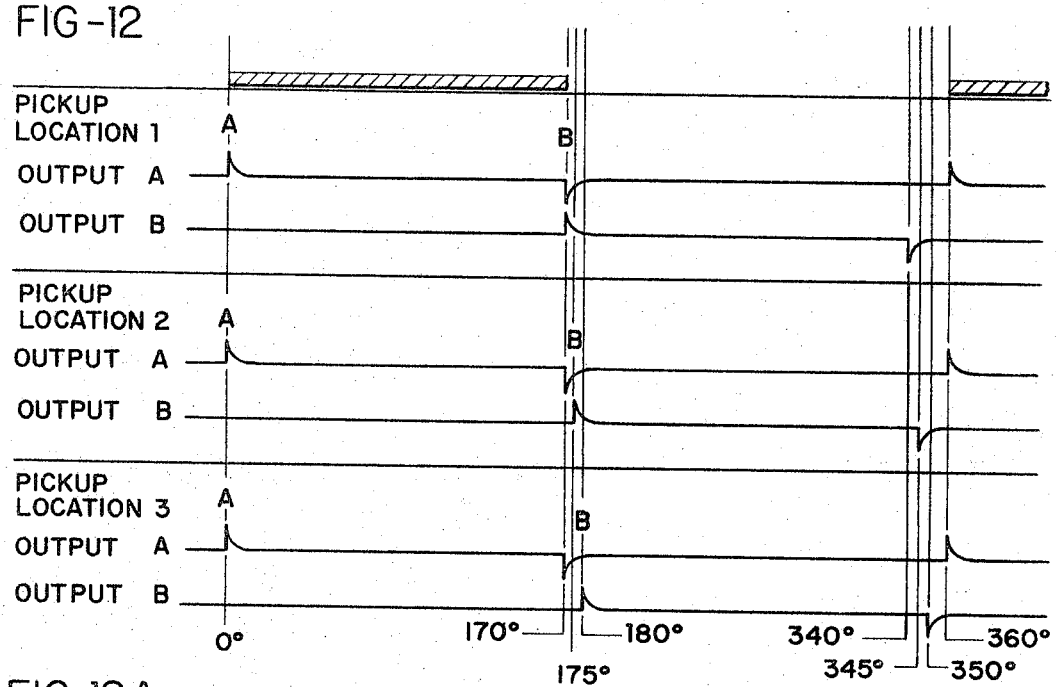
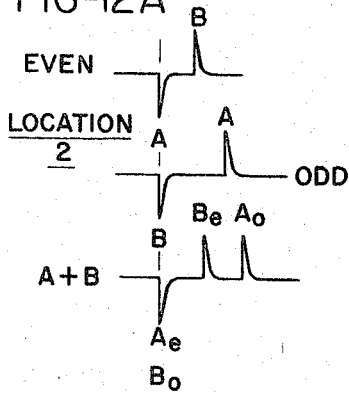
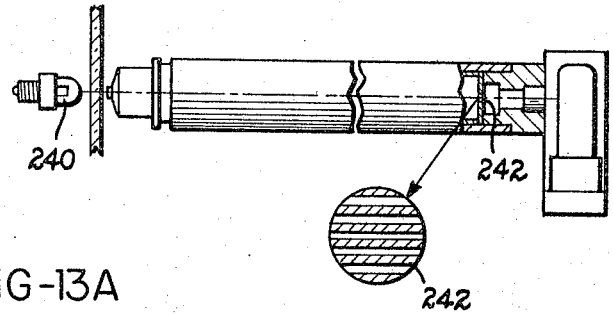
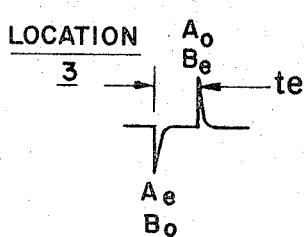
INVENTOR.
EDWIN R. KOLB
BY
Marechal, Biebel, French & Bugg
ATTORNEYS Feb. 28, 1967     E. R. KOLB     3,307,172
ENCODER METHODS AND APPARATUS Filed June 11, 1963     10 Sheets-Sheet 7

INVENTOR.
EDWIN R. KOLB
BY
Marechal, Biebel, French & Bugg
ATTORNEYS

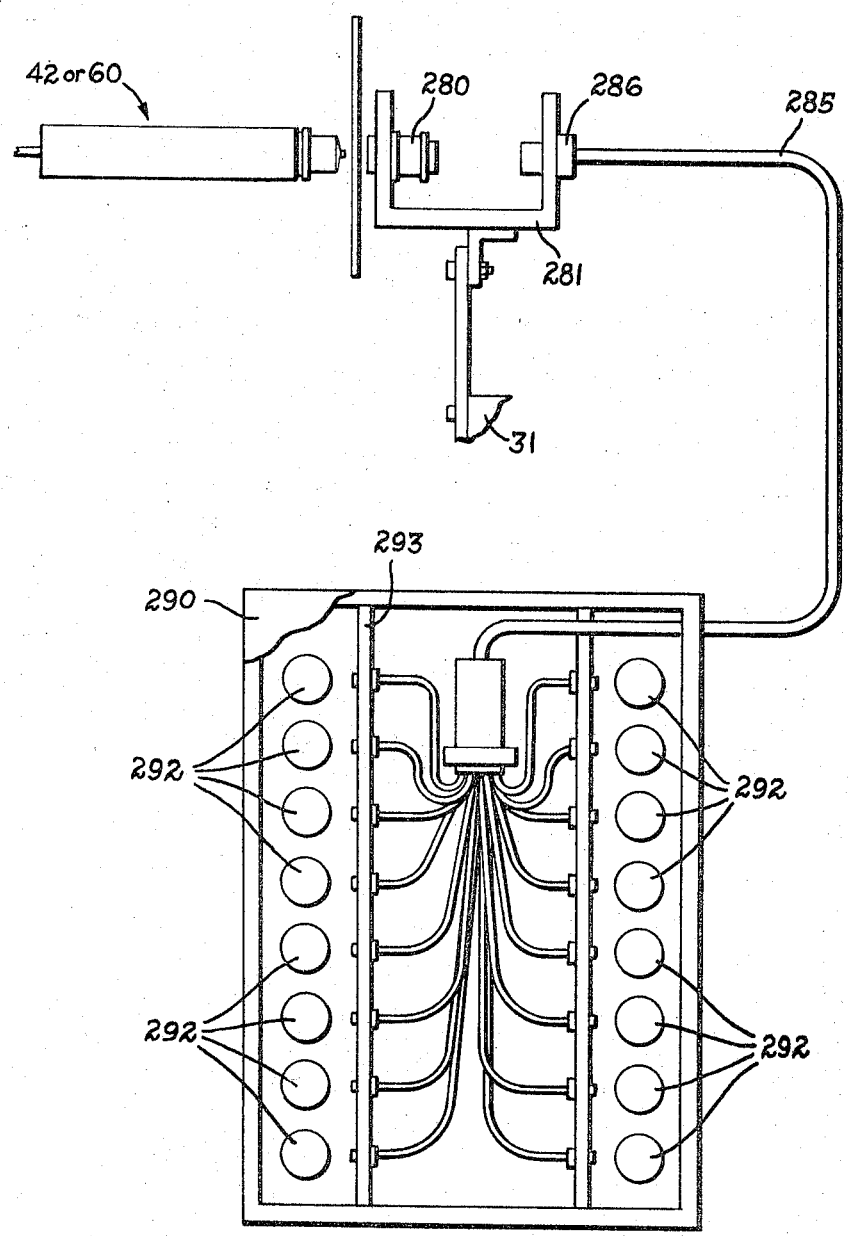

Feb. 28, 1967  E. R. KOLB  3,307,172
ENCODER METHODS AND APPARATUS
Filed June 11, 1963  10 Sheets-Sheet 9

2 INPUT NOR GATE DRIVE

INVENTOR.
EDWIN R. KOLB
BY
Marechal, Biebel, French & Bugg
ATTORNEYS

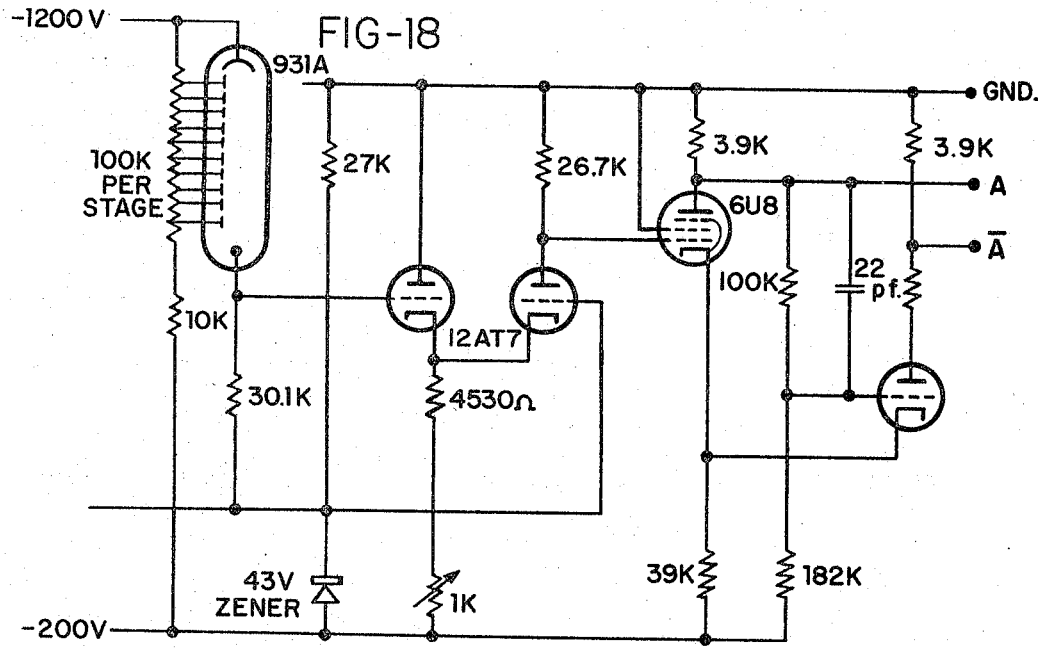
ENCODER READOUT PHOTOMULTIPLIER AMPLIFIER AND SCHMITT TRIGGER CIRCUIT
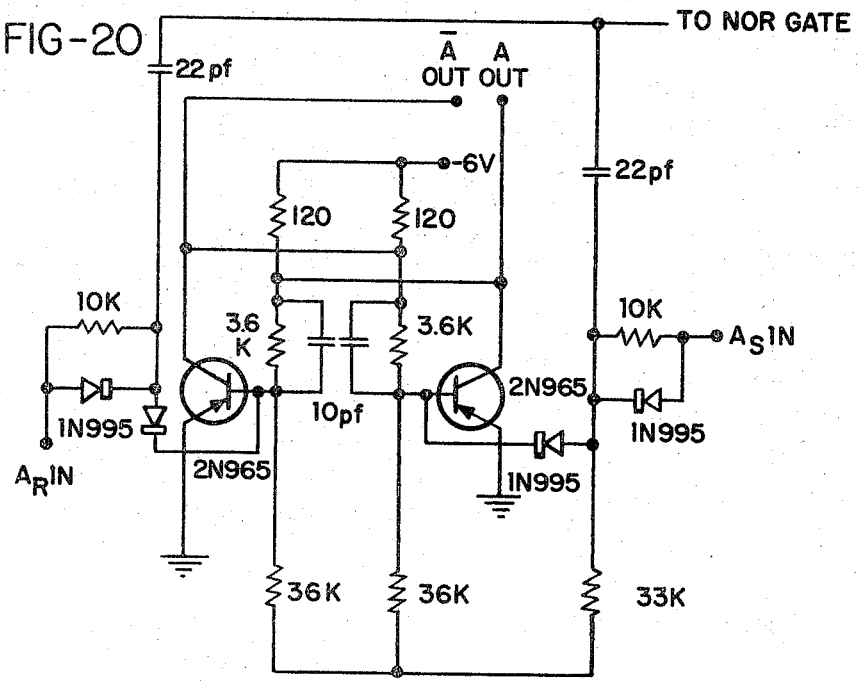
R-S MEMORY WITH "AND" GATE INPUT
*INVENTOR.*
EDWIN R. KOLB
BY
ATTORNEYS United States Patent Office 3,307,172
Patented Feb. 28, 1967

3,307,172
ENCODER METHODS AND APPARATUS
Edwin R. Kolb, University Heights, Ohio, assignor to Harris-Intertype Corporation, Cleveland, Ohio, a corporation of Delaware
Filed June 11, 1963, Ser. No. 287,047
20 Claims. (Cl. 340—347)

This invention relates to high density information storage and retrieval, and more particularly to methods and apparatus for making and reading high density shaft angle encoders.

This invention is directed to high density information storage systems, and describes a preferred embodiment of forming binary marks or "bits" with equal annular spacing about a rotatable member. The member preferably is in the form of a disc having a planar surface perpendicular to the rotational axis of the disc, and the binary information or "bits" are preferably arranged in angularly spaced relation with a maximum packing density, limited only by the resolution of the optical elements employed, of the photographic materials used on the disc, and of the degree at which mechanical errors can be held to a minimum. It will be appreciated, however, that other recording and storage systems can be used in accordance with the invention, for example a disc or drum can be employed, and magnetic, electrostatic or mechanical storage members, and corresponding recording and readback transducer devices can be utilized, although some of these may have specific limitations with regard to packing density or speed of operation.

In order to understand the features of the invention, it is desirable to define certain terminology used hereafter. A master disc, or its equivalent, such as is prepared in accordance with the invention, has a plurality of code marks arranged in a circle and dividing the disc into an integral number of parts. The number of marks which can be applied in accordance with the invention is great, as will be explained, but they are placed with such accuracy and precision that all marks are equally spaced about a circle which has its center at the axis of rotation of the disc.

This master disc has utility not only in providing an angular readout of great precision, but it also may be used as a reference for shaft angle position to make directly a coded disc, i.e., a disc which has thereon a complete code progression. Again, this code may be packed at high density corresponding to that of the master, so that a great number of code marks can be carried on such a code disc. The master disc may also be used in marking an encoding disc which may carry for example a full binary code or reflected binary code, providing for storage of intelligence on such an encoding disc.

Prior techniques which have been employed in the production of high density shaft angle encoders have included mechanical dividing machines which are rigidly mounted on sunken shafts of concrete in order to minimize errors due to vibration. The making of a disc of high packing density on such machines has been a laborious, tedious and time-consuming job requiring exceedingly accurate measurements. Even then, the limit appears to have been reached of a division of $2^{15}$ on a disc with a nine-inch O.D. On the other hand, high density discs which have been made on turntables with high frequency oscillators require exceedingly accurate speed regulation.

The methods employed in the present invention permit the use of apparatus which may be mounted on casters so as to be readily mobile between various positions, such as a darkroom, a laboratory, and a machine shop. Rotational speed regulation is not critical, and the effects of random vibrations have been essentially eliminated. With these methods a 4.75" disc has been divided in excess of $2^{16}$, and a packing density in excess of 5.6 million bits per square inch has been attained.

This invention provides a method of accurately dividing a disc into two binary parts, that is, $2^1$, followed by a division of subsequent discs to $2_2$, $2_3$, $2_4$, etc., with information read directly off of each of the preceding discs, while continuously measuring and correcting for errors in bit size and spacing.

It is therefore a principal object of this invention to provide method and apparatus for accurately dividing a member by placing thereon a plurality of angularly spaced marks or information bits at precise locations.

Another object of this invention is the provision of method and apparatus for subdividing a disc into a plurality of even numbered binary marks or bits of substantially equal size separated by equal spacings without the use of dividing machines or high frequency oscillators, and substantially eliminating the effects of random vibration.

A still further object of this invention is the provision of method and apparatus for forming a shaft angle encoding disc having a maximum possible density limited by optical and film limitations and which substantially eliminates many of the usual mechanically introduced errors.

A still further object of this invention is the provision of method and apparatus for forming a high density shaft angle encoding disc on relatively light-weight apparatus without the use of gearing and which is not dependent upon a perfectly constant angular velocity in the rotation of the disc about its axis in order to achieve uniformity of bit size and angular spacing.

A further object of this invention is the provision of method and apparatus of making high density shaft angle encoding discs and the like at a minimum of expense and time, using commonly available laboratory instruments.

A still further object of this invention is the provision of methods and apparatus for measuring bit sizes and accumulated error in any given disc, and to make a corrected disc directly from a disc with error.

A further object of this invention is the provision of methods and apparatus for sub-dividing discs into an even number of angular parts with the discs having the greater number of sub-divisions being produced successively from discs having the lower number of sub-divisions.

Another object of this invention is the provision of a fiber optic read-out of a multi-track high density disc, and method.

A further object of this invention is the provision of an encoding disc and method including a synchronizing track for unambiguous read-out of a binary code.

These and other objects and advantages of the invention will be apparent from the following description, the accompanying drawings and the appended claims.

In the drawings:

FIG. 1 is an elevational view of a portion of the apparatus of this invention;

FIG. 2 is a vertical section looking at one end of the spindle taken generally along the line 2—2 of FIG. 1;

FIG. 3 is a further section showing the arrangement for mounting the photomultiplier tubes taken generally along the line 3—3 of FIG. 1;

FIG. 4 is a fragmentary section through one end of the spindle showing the arrangement for mounting one of the photographic plates thereon;

FIG. 5 is a fragmentary detail showing an arrangement for adjusting the focus of one of the pickup heads;

FIG. 10 is a diagram representing the method of setting up the pickup heads in making the first division;

FIG. 11 is a diagram similar to FIG. 10 showing the outputs of the photomultiplier tubes in setting up the pickup heads for making the second division of the disc;

FIGS. 12 and 12A are diagrams illustrating the first error correction method;

FIG. 13 is a fragmentary view, partially in section, of one of the reading heads modified for the purpose of the second error correction method;

FIG. 13A shows the wave form of the pickup outputs as applied to an oscilloscope in the practice of the second error correction method;

FIG. 16 is a somewhat diagrammatic view of the fiber optic read-out;

FIG. 18 is a schematic diagram of an encoder read out photomultiplier amplifier and Schmitt trigger circuit;

FIG. 20 is a schematic diagram of a R–S memory circuit together with an AND gate circuit.

GENERAL DESCRIPTION

The apparatus of FIGS. 1 to 7 is related to the readout considerations and to the method used in dividing a circle. A rotating spindle has a separate photographic plate or disc mounted on each end for synchronous rotation. The plate on one end consists of a processed disc which is read out by two optical pickups A and B; the plate on the other end consists of an unexposed disc and is recorded on as by an optical engraving head. The spindle provides suitable means for rotating the two plates in exact synchronism.

At the beginning of an operation, a single line is made manually on the disc on one end of the apparatus, and as this disc rotates an electrical pulse will be produced as the line passes each of the two pickups. These pulses are displayed on an oscilloscope, the time base of which is adjusted so that it is equivalent to the time of one revolution, that is, for the line to pass the same pickup again. The physical location of the second pickup is adjusted so that its pulse occurs midway in this cycle, or in the center of the oscilloscope screen.

These pulses are then fed into the circuit which controls the recorder, such as a glow modulator tube, and as the mark passes pickup A, the glow modulator tube is turned on and as it passes pickup B, it is turned off. In this way, a track is made half way around the second disc.

Figure 9:
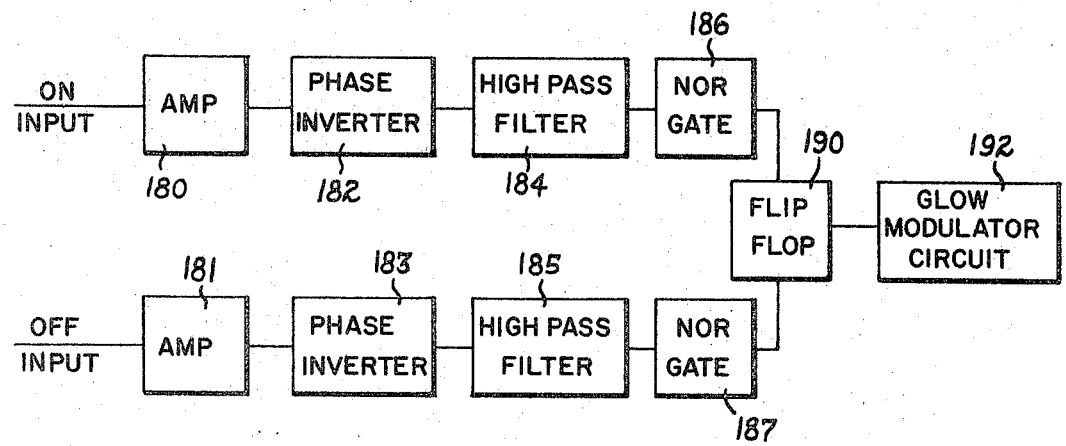
FIG. 9 is a diagram of the glow modulator control circuits.

The accuracy of the division depends upon the time base in the oscilloscope, rotational accuracy of the spindle and the accuracy with which the second pickup was placed. This accuracy is, of course, not adequate, so that additional techniques are required to refine it, as described further on. On the second end of the spindle a plate has thus been exposed with a track half way around, that is, a $2^1$ track on it. The spindle is taken out of the apparatus and the plate developed while still in place so that its rotational center is not lost. After the second plate is processed and dried, it is ready for readout by the two pickups and an unexposed plate is mounted in place of the plate which bore the single mark on the other end of the spindle. As the spindle revolves, the $2^1$ track rotates past the two pickups and each pickup circuit, will, in turn produce a positive pulse at the clear to opaque transition of the track and a negative pulse at the opaque to clear transition of the track. Pulses from the first pickup are again set up on the oscilloscope trace with one at the beginning of the trace and one at the end of the trace, for instance one at the zero centimeter mark and one at the 10-centimeter mark of the usual oscilloscope screen. Pickup B is then repositioned so that its pulse occurs in the center of the trace. The pulses from these pickups are then sent to a glow modulator tube circuit (FIG. 9). The pulses from pickup A turn the glow modulator tube on and pulses from pickup B turn the tube off. In this way a track with 4 bits is produced, that is, a $2^2$ track. When this track is processed and read back by the two pickups and an unexposed plate is mounted on the end which had previously held a two division plate, the procedure is again repeated so that an 8-bit plate is produced. This procedure is carried on with each successive plate having twice the number of divisions as the previous plate until the final master disc is obtained.

When this master disc is obtained, it may be used to produce an encoding disc on the opposite end of the spindle in the following manner: The pulses from the master disc are fed into a binary counter and the output of the counter drives the glow modulator circuit. The counter is adjustable so that its output may be taken from any stage. With the optical engraving head set at the radius decided for the least significant digit track, the output may be taken from the input of the counter to drive the glow modulator tube. After that track is exposed, the optical recording head may be repositioned for the next track and the output may be taken following the first stage in the counter. For the third track, the optical engraving head may be positioned to the proper radius for it and the output taken after the second stage in the counter. In this manner, all the tracks may be exposed.

Mechanics and optics

In considering the problem of making a high resolution shaft angle encoder, the maximum number of divisions in the least significant bit track becomes the determining factor in considering the accuracy by which the mechanical and optical components are made. For instance, in a $2^{10}$ bit encoder there are 1024 divisions in the least significant track, and in a $2^{16}$ bit encoder there are 65,536 divisions.

A spindle and spindle support are employed which can hold a glass photographic plate or disc on either end thereof in a clamped spaced apart relation so as to make the emulsion on each plate run true in the focal plane and to the rotational axis of the spindle. Referring to FIGS. 1–7 which constitute a preferred embodiment of the mechanical and optical portion of the invention, a spindle 20 is shown as being supported or mounted for rotation about its axis between a pair of fixed centers, which may include on one end the bench head 22 with an adjustable conical center 23 and a similar bench head 25 with a similar conical center 26 on the other end. The heads 22 and 25 are supported in a raised position above the surface of a supporting table bench 30 by supporting blocks 31 and 32. The blocks 31 and 32 are preferably made out of a stable metal material which is selected in regard to its ability to hold its shape, and one such suitable material is known in the trade as Meehanite. The table 30 may be mounted on casters for convenience in moving about.

The centers 23 and 25 are preferably formed of wear resistant material such as carbide. The spindle 20 is preferably constructed of stainless steel (such as Armco Steel 17–4PH) which resists photographic chemicals and which has been hardened so that the center hole wear is minimized.

The angular velocity requirements of the method are not critical, and the rate of rotation is chosen out of consideration of exposure time and the maximum number of bits desired. A small electric motor 35 may provide the means for rotating the spindle at a substantially constant angular velocity. The motor 35 is drivably connected by a belt 36 to a cylindrical surface 38, one of which is formed adjacent each end of the spindle, thus permitting the spindle 20 to be driven at either end by the belt and motor.

The recording and reading apparatus is mounted on a block or platform 40 which is preferably formed of the same material as the blocks 31 and 32. Thus, a fixed reading head 42 (often referred to herein as head "A") is mounted for transverse focusing movement in V-notches 43 and 44 (FIG. 5) formed in a support 45. Fine focusing movement of the fixed head 42 may be effected by a lever 48 which is pivotally mounted on the block 45 having inwardly extending finger 49 engageable with a depending pin 50 connected to the head 42, and further formed with a transverse extending arm 52 threadedly receiving an adjusting screw 53 which bears against an adjacent surface of the block 45. A spring 54 provides return movement of the lever 48.

The apparatus further includes a second reading head 60 (often referred to herein as head "B"), mounted on the platform in angularly spaced relation to the fixed pickup head 42. The head 60 is adjustable through substantially a 90° arc with respect to the fixed head 42, as shown by the full line and broken line positions in FIG. 2. In other words, the head 60 is adjustable between 90° and 180° with respect to the head 42.

Means for supporting the movable head 60 includes a V-block support 62, similar to the support 45, mounted for vertical sliding movement on a pair of rods 64, with vertical adjustment on the rods 64 being provided.

The vertical rods 64 are mounted on a base 68 for pivotal movement about pin 70. The rods 64 are joined at the top at a bar 71 which also supports an adjusting rod 72 threaded into the block 62, providing fine vertical adjustment by the knob 73.

Pivotal movement of the movable reading head 60 about the pivot 70 is effected by a threaded push rod 77 bearing against the bar 71. The push rod 77 with adjusting knob 78 is rigidly supported on a connecting block 79 by a pair of fixed vertically extending support rods 80. Fine adjustment may be effected in the vertical and horizontal planes respectively by the knobs 73 and 78. Focusing of the head may conveniently be effected through a lever arrangement similar to the lever 48 of the head 42. Through this arrangement the head 60 may be adjusted with accuracy in any position from 90° to 180° with respect to the angular position of the fixed head 42 about the axis of the spindle 20.

The apparatus further includes an "engraving" or recording head 90. The recording head 90 in a block 91 is supported on a compound slide mechanism 92 providing movements in two directions, one for focus and one for radial movement with respect to the spindle axis. The mechanism 92 is supported on the base 40 by a block 94.

The spindle 20 is adapted for the support of a photographic plate on each end thereof in planes which are perpendicular to the spindle axis. Thus, the spindle 20 supports a first or prepared plate 95 in position for reading by the heads 42 and 60, and at its other end a second or unexposed plate 96 for recording by the head 90. The spindle 20 forms the means for rigidly mounting the plates for synchronous rotational movement. As shown in FIG. 4, each end of the spindle 20 is formed with a radial plate supporting and locating surface 98 which has been formed as true as possible to a plane perpendicular to the rotational axis of the spindle 20. Preferably, the spindle is placed in a cylindrical grinder and rotated on the same centers 23 and 26 and the plate locating surfaces 98 are thus accurately ground.

The spindles 28 are also shouldered at 100 to support the photographic plate centers, and a retainer cap 101 is retained by screws 102 to clamp the plate in place against the surface 98, on the end of the spindle. Once the plate has been clamped into position it is preferably not moved until the plate is completed, so that the rotational center is preserved.

Figure 6:
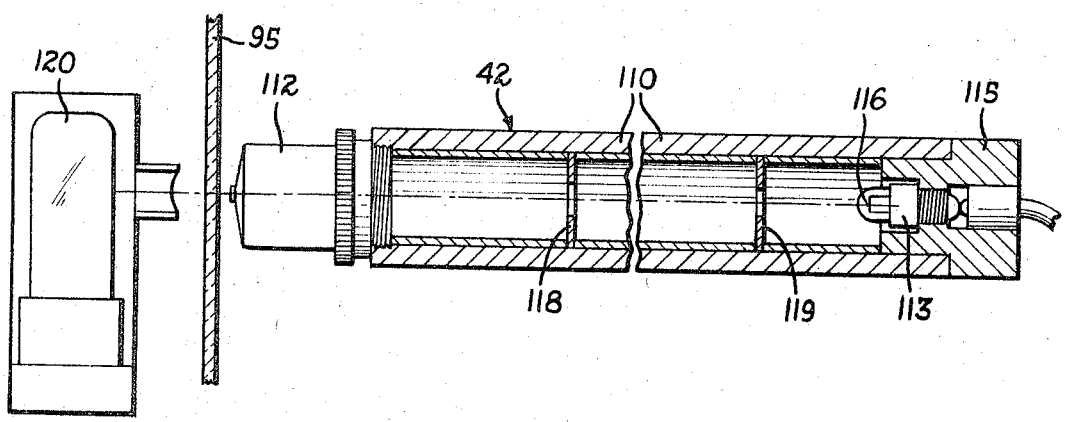
FIG. 6 is a transverse section through one of the pickup heads.

One of the reading heads (42 or 60) is shown in detail in FIG. 6. It will be seen that the head is formed with a tubular body 110 with a projecting lens 112 mounted on end and a tungsten filament light source or lamp 113 removably mounted in a holder 115 in the other end. The lens 112 consists of a microscope objective arranged to project a micro-luminous image of lamp filament 116 onto the emulsion surface of the disc 95. The filament of the lamp is linear and of a small diameter, such as 0.0015 inch, to produce a luminous image which forms a small part of the width of the smallest bit or mark desired. The lamp 113 may be rotated in the holder 115, to position its filament radially of the plate 95. Also, for certain operations, the holder 115 is removed and a photomultiplier tube inserted therein. Light baffles 118 and 119 are positioned in the tube 110 intermediate the lamp 113 and the lens 112.

A photomultiplier tube 120 (or 121), one being provided for each of the fixed and movable pickups, is adjustably positioned on the opposite side of the plate 95 to detect any light allowed to pass through the plate from the heads 42 or 60.

The photomultiplier tubes 120 and 121 are adjustably mounted on the block 32 on slotted brackets 124 and 125, as shown in FIG. 3. The brackets provide the means by which the position of the photomultiplier tubes may be adjusted to intercept the light transmitted through the disc by the illuminated filament image transmitted by the reading heads 42 and 60.

Figure 7:
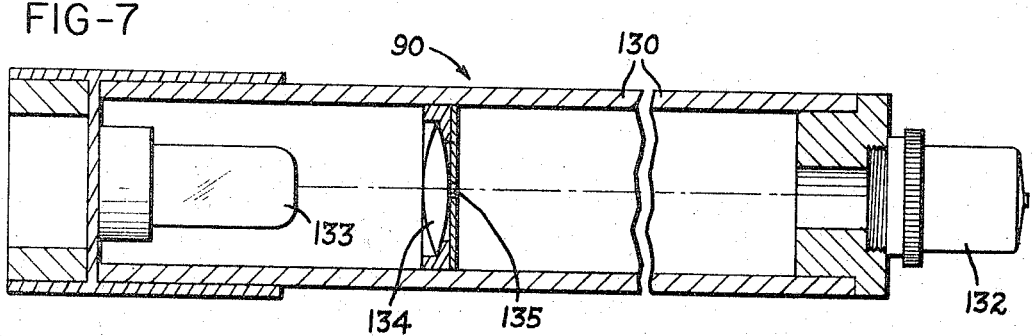
FIG. 7 is a transverse section through the recording head.

The recording or engraving head 90 projects a micro-image of a slit onto the rotating plate 96. The structure of the head 90 is shown in FIG. 7 as including a tubular body 130 which supports a microscope objective lens 132 at one end. The recording head 90 further includes a controllable light source, such as a glow modulator tube 133 received in the other end of the tube. The glow modulator tube 133 illuminates a condenser lens 134 which is placed immediately behind a mask defining a narrow slit 135, which is shown in FIG. 7 in exaggerated form for the purpose of illustration. Actually, the slit may be formed by positioning a pair of razor blade edges together and clamping them in position while observing the gap under a microscope so that the slit has a defined opening therethrough in relation to the reduction in image size effected by the lens 132. As an example, the slit 135 may be set at 0.0015 inch and reduced forty times to form a micro-image of 0.000038 inch, which in any case should be a fraction of the smallest bit size.

A glow modulator tube such as employed in the recording head 90 utilizes a small crater discharge of high intensity, and the intensity is roughly proportional to the current flowing through the tube. In suitable circuits, it can easily be modulated at frequencies up to 60,000 cycles per second. By limiting the frequency to about 6 kc., the on and off time of the tube becomes an insignificant part of the cycle. As an example, if sufficient light is available, it would be possible to expose a $2^{16}$ bit trace at 6 kc. with a disc making one revolution in eleven seconds.

Figure 9A:
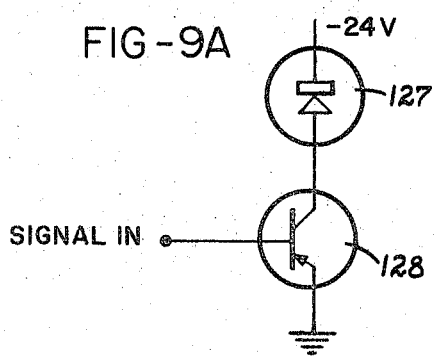
FIG. 9A shows a modified form of a recording light source.

The invention is not limited to the use of a glow modulator recording light source. With recent advance in the semiconductor art, particularly with regard to diode light sources, some of which have been used as lasers, it is possible to use these to record information with a semi-conductive light source. One such light source may be a light emitting diode of GaAs, as shown at 127 in FIG. 9A, operating through a transistor 128, and used with infrared sensitive film. Such light sources have the ability of high frequency operation with an output roughly proportional to current.

As described above, the reading heads are brought into focus by the manipulation of the knobs 53 and 65. The correct focus may be determined by observing the output of each photomultiplier tube 120 or 121 directly on an oscilloscope with the plate rotating. The focus can be adjusted until the time rise is minimum and the amplitude is maximum.

The focus of the recording or engraving head 90 requires a slightly different technique. A 0.0001" dial indicator 140 is mounted on the block 91 so that the bearing ball of the indicator touches the photographic emulsion just inside of the radius where the exposure is to be made on the plate 96. In this way, the engraving head 90 may be brought to the same distance from the emulsion with each substitution of the plate 96. In addition, the spindle 20 may be rotated by hand, and the dial indicator 140 used to check the runout of the emulsion surface.

The zero position of the dial indicator 140 may be set by making a series of exposures on a test plate at different settings of the head. Optimum focus may be chosen by utilizing a microscope to inspect the final image. The focus may also be checked by setting up a microscope to view the image from the optical engraving head when projected on a plate in the exposing position. The test plate may then be removed and an unexposed plate installed, and the dial indicator 140 used to focus the head 90. Preferably, the focus of the engraving head 90 is a position which is an average of the amount of runout in the plate, provided this does not exceed a predetermined maximum for the definition required.

*Dividing method*

Figure 8:
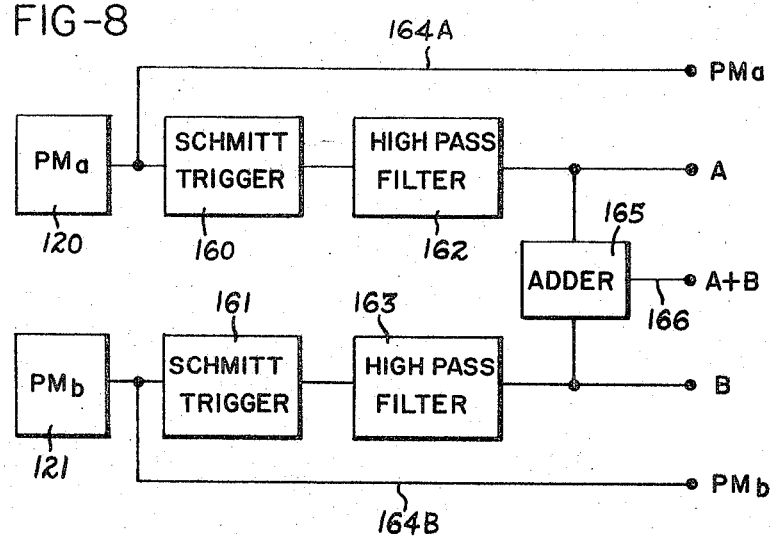
FIG. 8 is a diagram of the photomultiplier tube circuits.

The outputs of the photomultiplier tubes 120 and 121, which will be designated as A and B corresponding respectively to the pickup heads 42 and 60, are applied to a circuit such as shown in block diagram in FIG. 8. It will be obvious that other suitable circuits may be used, the purpose being to form pulses of short duration and constant amplitude at the coincidence of a reading head with the leading and trailing edges of a mark on the disc being read. Thus, a suitable circuit as shown in FIG. 8 includes a pair of Schmitt triggers 160, 161, one for each photomultiplying tube, followed by high pass filters 162, 163 to produce pulses of constant amplitude and fast rise time in order to drive the glow modulator control circuit of FIG. 9 and to provide an oscilloscope presentation. As shown in FIG. 8, outputs 164A and 164B may be taken directly from the photomultiplier tubes 120 or 121 to provide for the direct observation of the signals, such as for focusing the pickup heads. In addition, the outputs A and B may be added in an adder 165 for the purpose of presenting the combined outputs to an oscilloscope through line 166.

A suitable glow modulator tube control circuit is shown in block diagram in FIG. 9 wherein the A and B outputs of each of the photomultiplying tubes, which constitute the "on" and "off" signals, are separately amplified in amplifiers 180, 181 and applied to phase inverters 182, 183 so that both positive and negative pulses are available regardless of the polarity of the input pulses. These pulses are then applied in separate channels through high pass filters 184, 185 to diode clipper or NOR gates 186, 187 so that negative pulses are available for both positive or negative input pulses. These may then be amplified and applied to trigger a flip-flop circuit 190 which controls the grid voltage to the power tube circuit 192 which operates the glow modulator tube 133. As will be seen in FIG. 9, separate inputs are provided for both sides of the flip-flop circuit 190 so that the on-off function is independently controlled. In addition, switching may be provided in the flip-flop circuit so that the glow modulator tube can be turned on with either positive or negative pulses or both, and turned off with positive or negative pulses or both.

The diagram of FIG. 10 shows the arrangement of the reading heads A and B with respect to the plate 95 when making the first division of the plate 96. An unexposed photographic plate is attached to the spindle 20 in the position of the plate 96 of FIG. 1, and the recording head is focused as described above. A processed plate is attached in the position of the plate 95 on the other end of the spindle for reading by the pickups 42 and 60. The processed plate is formed with a single mark 200 thereon, as shown in FIG. 10. The mark 200 on the plate 95 is made by any suitable means, such as by manually masking or marking the plate. Suitable means are employed to protect the emulsion on the plate 96 from the light, or for this purpose the entire apparatus may be moved into a darkroom. The motor 35 is started and the spindle 20 is rotated at any convenient predetermined rate. It should be noted that the rate and uniformity of rotation are not particularly critical, and a ten percent variation in angular velocity may be tolerated.

The outputs of the photomultiplier tubes A and B are added in the circuit of FIG. 8 and displayed on an oscilloscope, the time base of which is adjusted so that it is equivalent to the time of one full revolution of the plate 95. In other words, the oscilloscope is adjusted so that a single sweep includes the time it takes for the mark on the disc to pass pickup A and then to pass the same pickup a second time as shown on line 205. The pulse 206 due to the passing of the mark by pickup B will be located some place between the A pulses.

Since the oscilloscope base is timed to include a full revolution, alternate sweeps of the scope will be triggered by a B pulse (the next following pulse), with an A pulse falling in between as shown in line 210. Therefore, after peaking and adding in the circuit of FIG. 8, the first A and the first B pulses will coincide, and the intermediate pulses which consist of B pulses for even sweeps and A pulses for odd sweeps will be shown as line 212 in FIG. 10. The movable pickup 60 is then adjusted so that the A and B pulses in the center of the scope coalesce. For greater accuracy of observation, the sweep may be expanded, and by this method, accuracy of about one part in a thousand can initially be obtained.

The pulses of the A and B pickups are then fed into the circuit of FIG. 9 which controls the glow modulator tube 133 in the recording head 90. As the mark 200 passes pickup A, the glow modulator tube is turned on and as it passes pickup B, it is turned off. In this manner, a $2^1$ track is made half-way around the disc 96, as shown in FIG. 11. The accuracy of this initial division depends upon the time base in the oscilloscope, the rotational accuracy of the spindle, and the accuracy with which the movable pickup 60 was initially positioned.

The spindle 20 may then be taken out of the apparatus and the plate 96 may be developed while still in place so that its initial center is not lost. After development, it is ready for read-out by the two reading heads and an unexposed plate is mounted in place of the plate 95 which bore the single mark on the other end of the spindle.

At this point it is obvious that the relative position of the plates and heads may be reversed. One way of doing this is to turn the spindle 20 end for end. However, this may be objectionable due to the fact that it may introduce a possible source of error. Preferably, the platform 40 is mounted to the support 30 in such a manner that it may be withdrawn and turned through 180 degrees and then repositioned on the support 30. This may require some readjustment of the pickup and recording heads as described above.

At this point, the newly formed $2^1$ disc is ready for observation to determine the extent of error in the initial division. The method of determining this error and the process for making a correct $2^1$ disc are described below under error correction. Assuming now that a $2^1$ disc is on the spindle 20 and is sufficiently free of error, the reading heads must now be repositioned angularly with respect to each other to make a further division. Obviously, the movable head 60 must be at ninety or two hundred seventy degrees from the fixed head 42. Again, the outputs of the photomultiplier tubes as shown at location 1 of FIG. 11, are applied to the circuit of FIG. 8 and displayed on an oscilloscope, which has been adjusted as previously described. As shown at location 3 in FIG. 11, pulses from the pickup A appear on the oscilloscope trace with one at the beginning of the trace and one at the other end of the trace. The alternate sweep is keyed on the next following B pulse, as shown at location 3, FIG. 11. The movable pickup 60 may then be positioned so that its pulse occurs in the center of the trace, and coalesces with the A pulse of alternate sweeps, as previously described.

An unexposed plate which has been mounted on the recording end of the spindle is then exposed to form a track with four bits of information, that is a $2^2$ track. This procedure, after correcting the newly formed disc, is then repeated so that an eight bit plate is produced, and the procedure is carried on with each successive plate having twice the number of divisions as the previous plate, until the final master disc having the desired division is obtained.

The basic dividing technique described above utilizes two pickups to divide by 2. The same basic technique can be used to divide by 3 or 5, etc., by using 3 or 5 pickups or more. In this way, decimal or degree discs may be made.

The effects of random vibrations may be essentially eliminated by revolving the spindle 20 a plurality of revolutions during the exposure period so that each bit on the disc 96 is exposed a number of times. In this way, random vibration motions are averaged out, so that the position and the average size of each bit is not altered, although the edge of the bit may be slightly "smeared." A smear is minimized by using high contrast plates and by developing the plates to a high gamma. For instance, the disc 96 may be rotated at 10 r.p.m. and exposed for eight minutes, so that each bit on the disc has been exposed essentially eighty times. Thus the starting and stopping points when exposing are not critical.

*First error correction method*

Because of the nonlinearity of the oscilloscope trace and the non-uniformity of the velocity of the spindle 20 and the difficulty in positioning the pulses from the pickup 60 precisely between those from the other pickup 42, the precision of the basic dividing technique may not be adequate. By expanding the oscilloscope trace, a division accuracy of about one part in one thousand may be achieved. However, an initial accuracy in division of better than one part in a million may be required.

Assume that a $2^1$ disc has been made with two divisions which should begin at exactly zero degrees and 180 degrees. Also assume the divisions actually begin at zero degrees and 170 degrees, so that the disc has an opaque track that runs from zero to 170 degrees and a clear track which runs from 170 degrees back to zero, as shown at the top of FIG. 12. With the pickups located as they were when this track was produced but now reading back this track rather than the previous one, the outputs would be as shown, in FIGURE 12, location 1. That is, when a negative pulse is produced by pickup A, a positive pulse would be produced simultaneously by pickup B, but when a positive pulse is produced by pickup A, a negative pulse from pickup B precedes it by 20°.

If now the movable pickup is adjusted 5° to change its position from 170° to 175°, a new pulse sequence occurs as shown in location 2 of FIGURE 12. Here the negative A pulse precedes the positive B pulse by 5° and the negative B pulse precedes the positive A pulse by 15°. Again the movable pickup is adjusted another 5° to 180° from the fixed pickup. The pulse timing is shown in location 3 for FIGURE 12. In this case, the negative A pulse precedes the positive B pulse by 10° and the negative B pulse precedes the positive A pulse by 10° and this 10° is the error in this track.

In application, the pulses from the A and B pickups are added (as provided for in the circuit, FIG. 8) and the oscilloscope is set up to trigger on negative pulses (if the opaque track is shorter than the clear one) as shown at location 2 in FIG. 12A. The positive alternate A and B pulses from the pickups are observed and as the movable pickup 60 is adjusted in the correct direction, these pulses move toward each other until they coalesce, as shown at "location 3" in FIG. 12A. In this manner, only the error has been observed.

At this point the pickups are positioned much more precisely 180 degrees apart and the time difference between the negative and positive pulse as seen on the oscilloscope screen is a measure of the error in the track being read. Now a new plate 96 is exposed on the other end of the spindle from information taken directly off of the plate with the error, and the glow modulator tube 133 is turned on by one of the pulses from pickup A and is turned off by the same polarity pulse from pickup B and a corrected $2^1$ disc is made. In other words, a second plate is rotated in synchronism with the first plate and is marked in accordance with the coincidence of the markings on the first plate with the adjusted position of the reading heads to produce binary markings on the second plate which are substantially free of the size and spatial errors of the marks on the first plate.

This corrected disc is developed and read back, and the above procedure can be repeated and a further correction produced, if necessary. In this way it is theoretically possible to make a perfect division of a circle into two parts. Accuracy in excess of one part in two million has been achieved. The method is effective since it does not equate the time base in the oscilloscope to the time base of the spindle during an entire revolution, but shows only the error, the difference in angular length of the opaque and clear portions of the track when comparing each to the angular separation of the pickups. Once a satisfactory disc is made, it is then divided in two by the basic technique and then corrected discs are made. This technique can be used so that each binary plate can be corrected to a high degree of accuracy.

The validity of the above-described technique for dividing a circle into an even number of binary bits and spaces can, perhaps, be better understood when it is considered that the first division is made from a disc which, by definition, is free of error. It will be appreciated that the first division, that is the $2^1$ disc, must be made to the highest degree of accuracy or with the least error, if further divisions are to be carried out, since any residual error will double with each division in relation to bit size (assuming that the division is by 2's). Since the $2^1$ disc is made directly from a disc having only a line or mark made thereon, and since there can not be any error introduced by reason of this single line, it is therefore possible to make the first division theoretically free of error, and as a practical matter, the first division may be in fact made very nearly free of error depending upon the extent that the physical parameters can be controlled. Thereafter further divisions may be made with the error minimized as described above.

*Second error correction method*

Later on, such as at $2^{15}$, when the divisions are small and bit frequency is high, a different correction technique is more useful. In this technique the pickups 42 and 60 are modified in the following manner: The track is illuminated by a small light source 240 (FIG. 13) placed at the normal position of the photomultipliers 120 and 121, and the microscope objectives in the pickups produce enlarged images of a plurality of the markings of the track. A multislit mask or screen 242 is placed in the pickup head which matches the idealized projected image size of the binary marks from the disc to be corrected. This screen may be made photographically or manually to its correst size such as by forming slits by masking then reducing photographically to size. The photomultipliers are located behind the multi-slit screen 242 in each reading head. This is conveniently done by removing the light housings 115 and replacing them with the photomultiplier tube immediately behind the mask or screen 242, as shown in FIG. 13.

As the disc is rotated about its axis on the spindle 20, the moving pattern is projected onto each of the masks in each head. The outputs of the photomultipliers as seen on the oscilloscope screen appear to be sinusoidal as shown in FIG. 13A, although they are theoretically triangular in shape. The output in this case is, however, the average of a plurality of bits so that it is more representative of the correct bit size. Preferably, at least twelve bits are observed by each pickup. The output of pickup B appears the same, and when observed together on the oscilloscope as shown in FIG. 13A, their phase changes represent the individual bit errors and the accumulated errors between the two positions of the pickups. In this way it is readily possible to judge the accuracy of the bit sizes and the accumulated error in the disc. Now it is desirable to make the bit sizes more nearly equal and to reduce the accumulated error to a minimum. The output of two photomultipliers are added and the movable pickup is adjusted so that the in phase portion of the two signals is a maximum. The resulting signal is now the average of twice the bits observed by each pickup, preferably at least 25 bits, half of which are taken from a different area of the disc. This signal is then passed through the Schmitt trigger circuit of FIG. 9 and used to make the corrected disc directly off of the disc having the error. Thus the bits on the new disc will be substantially free of error since this represents an average of the bit size and spacing of the marks on the original disc.

The averaging and correcting effect of this technique can be demonstrated mathematically as follows. Let the combined outputs from the two photomultipliers be $V = v_1 \sin(\omega t + \alpha) + v_2 \sin(\omega t + \beta)$ where $v_1$ and $v_2$ are the peak signals from the A and B pickups, respectively.

$\omega$ is the basic bit frequency and $\alpha$ and $\beta$ are errors as seen by pickups A and B. $\alpha$ and $\beta$ are functions of the angular position of the disc. If the illuminating light intensity is altered to make $v_1 = v_2 = v$, we obtain:

$V = v[\sin(\omega t + \alpha) + \sin(\omega t + \beta)]$ $= v[\cos \alpha \sin \omega t + \sin \alpha \cos \omega t + \cos \beta \sin \omega t + \sin \beta \cos \omega t]$ $= v[(\cos \alpha + \cos \beta) \sin \omega t + (\sin \alpha + \sin \beta) \cos \omega t]$ $= v\left[\left(2 \cos \frac{\alpha+\beta}{2}\right)\left(\cos \frac{\alpha-\beta}{2}\right) \sin \omega t + \left(2 \sin \frac{\alpha+\beta}{2}\right)\left(\cos \frac{\alpha-\beta}{2}\right) \cos \omega t\right]$ $= 2v\left(\cos \frac{\alpha-\beta}{2}\right)\left[\cos \frac{\alpha+\beta}{2} \sin \omega t + \sin \frac{\alpha+\beta}{2} \cos \omega t\right]$ $V = 2v\left(\cos \frac{\alpha-\beta}{2}\right) \sin\left(\omega t + \frac{\alpha+\beta}{2}\right)$ As the Schmitt trigger circuit is relatively insensitive to input sine wave amplitude variations, the $\cos\left(\frac{\alpha-\beta}{2}\right)$ term has little effect unless $(\alpha - \beta) \to \pi$.

The error is now the average of the error from either pickup alone. The average error can, of course, never be worse than the greatest individual error and will usually be less. It has been observed experimentally that this averaging process where bit spacings from various parts of the disc are averaged together to make a corrected disc is a converging one. It is obvious by the description given that the use of more than two pickups would speed up this averaging process and produce a corrected disc at a faster rate. Ideally, one would like to average all the bit sizes on the one disc to make the bits on the corrected discs more nearly perfect and this would produce a highly corrected disc immediately.

It may be necessary to go through the above averaging process more than once to make a satisfactory disc. A disc is considered satisfactory when its accumulated and bit size error is less than 25% of the bit width. Dividing such a disc by 2 will produce an error in the order of 50% which is about the maximum which can be tolerated.

The potency of this technique is perhaps best illustrated by the fact that an unfortunate accident occurred on a $2^{15}$ disc. In this accident, a quarter inch of the 4¾ inch track was completely scraped off of the glass plate. By using this two pickup error correcting technique, it was possible to reconstruct the missing portion such that after 3 discs, the error due to it was no greater than the greatest dividing error in the disc at that time.

*Method of making shaft angle encoding disc*

The above-described apparatus and methods relate to the making of a master disc which is evenly divided into binary bits. Such a master disc may then be employed in several manners for the high density storage of information. For instance, the master disc which is thus produced may be used to position another disc into the same number of angular positions or divisions, so that binary information may be encoded directly onto such a second disc in each arc of angular position. As an example, the unabridged English dictionary with approximately 500,000 entries may be encoded into a disc divided into $2^{19}$ parts, and binary information on each letter of each word including hyphenation could be carried on one hundred to one hundred twenty tracks. In making such a disc, the master disc would be mounted at one end of the spindle 20 and the disc to be encoded would be mounted on the other end, with the encoding information being applied to the recording head 90 through a punched tape reader, for example.

However, there are instances where it is desired to make an encoding disc, which may have formed thereon either the binary code or the reflected binary (Gray) code, or both. Thus, the master disc which has been divided by the foregoing methods is positioned for reading by one of the reading heads 42 or 60, and an unexposed plate is mounted on the other end of the spindle for recording by the recording head 90. The output of the reading head is applied to a suitable binary converter, such as the circuit shown in FIG. 14, which includes a pre-amplifier 260 and an array of binary flip-flop counters 262, there being in general, $n$ counter stages for a $2^n$ master disc.

Figure 14:
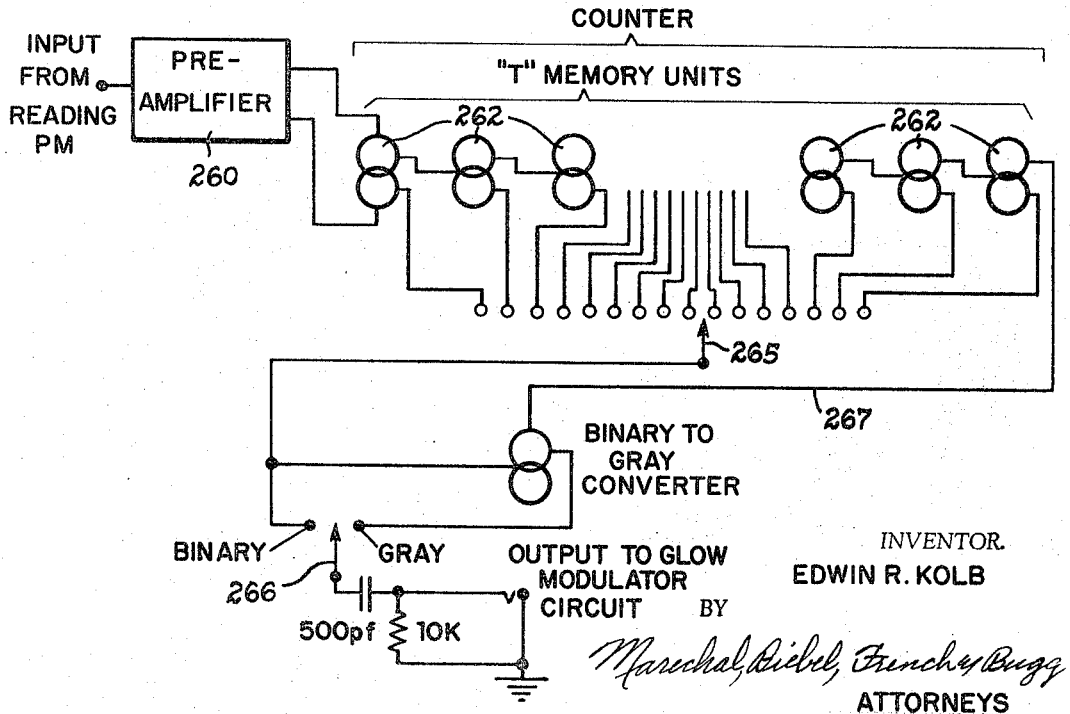
FIG. 14 is a diagram of a circuit for converting a master disc into either binary or cyclic binary code.

The spindle 20 is then rotated and the new disc is exposed for each track to be made. The binary code disc is readily made by counting the pulses from the master disc using "T" memory elements in leading edge logic, as shown in FIG. 14. The signal for the glow modulator tube circuit 192 for each track is taken after successive counter stages. Comparison of the binary and Gray codes indicates that each track of the Gray code can be generated from the corresponding track of the binary code if the Gray code track changes state each time the binary code track goes through a 0 to 1 transition. This is simply implemented by using leading edge logic and the proper output of the "T" memory elements in the binary counter to trigger an additional "T" memory element whose output would then be the desired Gray code. The rotary switch 265 allows the output to be switched to any stage of the binary counter, and the toggle switch 266 allows the output to be switched from the binary information to the Gray information. Connection 267 resets the binary-to-Gray converter once each revolution of the master disc to insure proper track to track Gray code phasing.

After the first track is made, the recording head 90 is moved radially to a new track position corresponding to the desired spacing of the tracks, and the rotary switch 265 is moved to the next binary position, and the procedure is repeated. Preferably the disc is rotated through a plurality of revolutions while exposing each track, so that the effects of random vibration are substantially reduced as described above. In this manner, all of the tracks may be exposed.

Figure 15:
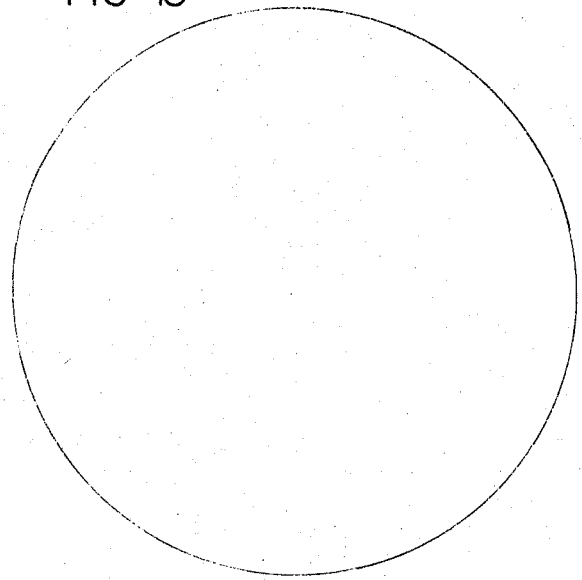
FIG. 15 is a photolithograph of an encoded disc made according to the teachings of this invention.
Figure 15A:
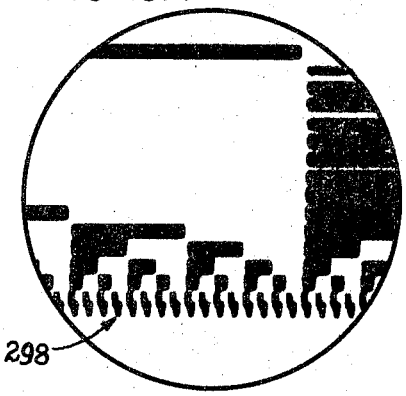
FIGS. 15A is a 125-times enlargement of a segment of the tracks of FIG. 15.

Reference may be had to FIG. 15 which shows the actual size of a sixteen track binary encoded disc which has been made from a $2^{16}$ master, with the smallest binary parts being made to $2^{15}$. The master, and the disc shown in FIG. 15, was made according to the above-described methods on the above-described apparatus. FIG. 15A is a photomicrograph of a segment of the disc of FIG. 15 enlarged 125 times.

*Encoder read out*

This invention includes provision for reading out a disc which has been encoded according to this method and apparatus. At the high density storage, megacycle read out rates are desired, and accordingly, photomultiplier tubes are preferred to to their ability to operate at high frequencies. The invention utilizes fiber optics for reading out disc tracks and for operating a bank of photomultiplier tubes in accordance with the reading. This apparatus is shown in FIG. 16 as including one of the reading heads 60 or 42. Preferably, the movable reading head 60 is used due to versatility in adjustment. In this instance, the reading head is employed to project a microimage of the filament, in the manner previously described in connection with FIG. 6. Preferably, the image projected has a width which is about one-half the width of the smallest bit, but the length of the image, that is its radial extent, is sufficient to illuminate all of the tracks. Thus, sixteen tracks, for example, may be positioned within radial spaces of 0.0001", and illuminated with an image length of 0.018".

The light passing through the emulsion on the disc is collected by a lens 280 supported on a holder 281 and provides the means for projecting an image of the tracks. The read out means further includes a plurality of light transmitting mono-filament optical fibers 285, there being provided one of these fibers for each of the tracks to be read. The ends of the fibers, which have been suitably polished, are held in an array within a block 286 supported on the holder 281.

For instance, in one embodiment sixteen fibers may be mounted side by side and potted in an epoxy resin, and then polished. Such fibers may have a diameter, for instance, of 0.003". The lens 280 projects an enlarged image on the ends of the fiber optic array with each single fiber of the array being lined up so that it covers exactly one track of the disc. If desired more than a single fiber per track can be used, although in a high density storage system the single fiber system may be used and has been found adequate.

Means for terminating the other end of each of the fibers at a different one of the photomultiplier tubes, for activating the tube cathodes, includes a light-tight box 290 wherein the photomultiplier tubes 292 are mounted in arrays. Suitable holders 293 support the individual fibers so that the light emitting from the polished ends is applied to the respective cathodes. In this manner, highly sensitive and high speed photo-electric transducers, which have bulk and size, may be used for reading out a code disc by the use of single fiber elements responsive to projected image of the code represented by each track.

Figure 17:
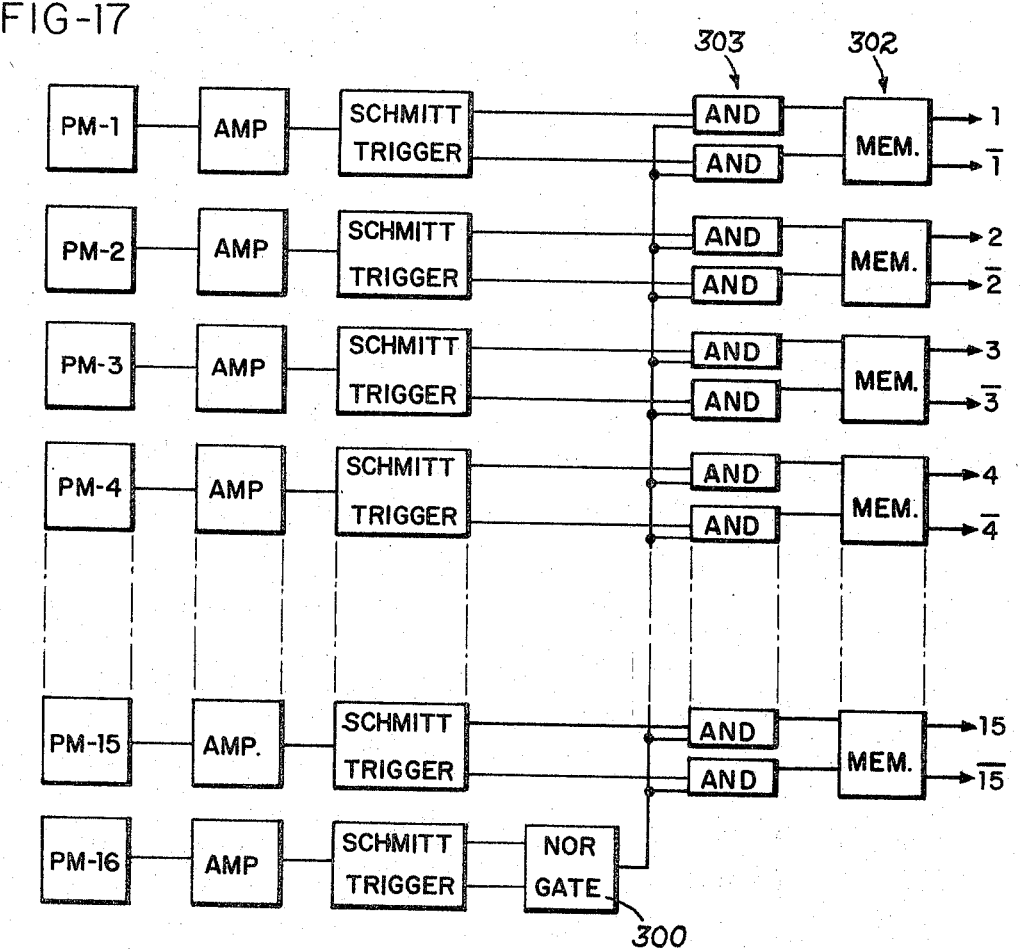
FIG. 17 is a block diagram of one embodiment of the apparatus wherein an unambiguous read out is obtained from an encoded disc.

As shown in FIG. 17, the output of each of the photomultiplier tubes is amplified and D.C. coupled to a Schmitt trigger circuit. By taking the output from either plate resistor of the Schmitt trigger, a signal is available (e.g., of about —10 volts in the example) for either a clear or opaque area on the disc.

The invention also includes provision for an unambiguous readout, and for this purpose any desired type of code information can be placed for example in the first fifteen of the sixteen tracks shown in FIG. 15A, while the sixteenth track will have alternate clear and opaque areas corresponding to every possible position of a code on the disc. In this respect, the sixteenth track might be termed the "least significant digit" track.

The output of the Schmitt trigger driven from the photomultiplier reading the sixteenth or synchronization track 298 is fed through a RC high pass filter to produce pulses which are in turn fed to the transistorized NOR gate 300, and thus this gate produces a positive going pulse regardless of whether the track being read is changing from clear to opaque or from opaque to clear. FIG. 17 shows also a suitable readout circuit embodying R–S memory circuits having inputs from AND gate circuits, these being indicated generally at 302 and 303, respectively. There are thirty of these AND gate circuits in the illustrated embodiment, one for each side of fifteen R–S memory elements corresponding to the fifteen tracks on which the code information appears. The second input to each of these AND gates is driven by the respective plate of the corresponding Schmitt trigger, thus each Schmitt trigger circuit will establish a level on one side or the other of each of the fifteen memory circuits such that when a pulse is generated by the NOR gate (from the sixteenth track) the respective memory circuit will be set into a state corresponding to the condtion of its Schmitt trigger at the time of the pulse. Thus, the output of the disk code exists at all times in the fifteen memory elements, and regardless of how many tracks actually change their state at any given time, the information of each track is simultaneously placed into the memory circuits. In this way an unambiguous readout is obtained from the disk.

Figure 19:
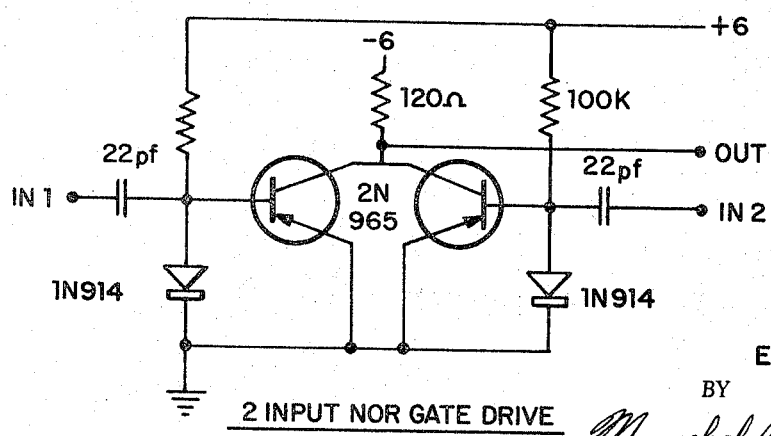
FIG. 19 is a schematic diagram of a two-input NOR gate circuit.

FIG. 18 is a circuit diagram showing a suitable form of readout photomultiplier amplifier and Schmitt trigger circuit. FIG. 19 shows the details of a typical NOR gate circuit, which is used in the readout arrangement as shown in the block diagram in FIG. 17, from the output of the sixteenth track. Finally, FIG. 20 shows a diagram of a suitable R–S memory circuit together with an AND gate circuit, whereby outputs may be obtained selectively from each track for either direct or complementary readout. The direct readout in FIG. 20 is labeled A out and the complementary readout is labeled $\overline{A}$.

SUMMARY

The present invention, therefore, provides a novel method of dividing a circular or cylindrical element accurately into a large number of equally angularly spaced information bits or marks. The division achieved according to this method has resulted in packing densities of discrete information bits up to 5.6 million bits per square inch.

Such accurate division of a circle may be used in many ways. For example, a single track of binary marks can be utilized with appropriate readouts to control the angularly positioning of a rotatable shaft to a high degree of precision. Track width sizes have been obtained of about 0.0007 inch, and information bit sizes have been obtained as small as 0.00006 inch.

Furthermore, it is possible to construct encoded members according to the invention which have a multiplicity of such tracks, and the tracks read simultaneously may contain either a straight code progression, or a random code providing information storage. Encoded members of this type have been constructed according to the invention as discs having discrete differential light-transmitting parts (i.e., opaque or transparent) forming information bits. A $2^{16}$ code has been placed on a code disc, for example as shown in FIGS. 15 and 15A, using a bit size of 0.00023 inch. Readout from such a disc has been achieved, according to the invention, at rates of at least one megacycle, and unambiguous readout has been attained at these rates by utilizing the least significant digit track to produce a synchronizing output, whereby the outputs from the other information tracks can be gated simultaneously into memory circuits. Thus, the output of the encoded member can exist at all times in the memory units, which may for example be flip flops, and regardless of how many of the tracks change state at a time the information of each track is simultaneously placed into the memory units.

While the methods and forms of apparatus herein described constitute preferred embodiments of the invention, it is to be understood that the invention is not limited to those precise methods and forms of apparatus, and that changes may be made therein without departing from the scope of the invention which is defined in the appended claims.

What is claimed is:

1. The method of angularly dividing a continuous annular element into a plurality of equally spaced angular bits comprising the steps of,
   mounting first and second annular elements for synchronous rotation with each other with said second element being capable of recording thereon,
   reading at least one mark on the first element at at least two angularly spaced positions, and
   recording on said second element in response to the coincidence of said mark on said first element with said positions.

2. The method of angularly dividing a continuous annular element into a plurality of equally spaced angular bits comprising the steps of,
   mounting first and second annular elements for synchronous rotation with each other with said second element being capable of recording thereon,
   reading at least one mark on the first element at at least two angularly spaced positions,
   recording on said second element in response to the coincidence of said mark on said first element with said positions,
   replacing said first element with a second element having marks formed thereon in accordance with the preceding steps, and
   producing markings on subsequent elements according to the preceding steps each representing further binary divisions of the mark on said first element.

3. The method of dividing a disc into a plurality of equally spaced angular parts comprising the steps of,
   mounting first and second discs for synchronous rotation with each other,
   reading at least one mark on the first disc with at least two reading heads which are angularly spaced from each other,
   marking said second disc with a recording head in response to the coincidence of said mark on said first disc with said reading heads,
   replacing said first disc with a second disc having marks formed thereon in accordance with the preceding steps, and
   producing markings on subsequent discs according to the preceding steps each representing further binary divisions of said first disc.

4. The method of angularly dividing a continuous annular element into a plurality of equal parts comprising the steps of,
   mounting first and second such elements for synchronous rotation with each other,
   observing at least one mark on said first element with at least two reading heads which are angularly spaced from each other,
   adjusting the effective observing position at at least one of said reading heads thereof so that the responses thereof are uniformly divided from each other as said first element is rotated, and
   marking said second element with binary markings in response to the passing of said mark on said first element with said reading heads to produce marks on said second element which are an even multiple of the marks on said first element.

5. The method of angularly dividing a continuous annular element into a plurality of equal parts comprising the steps of,
   mounting first and second such elements on a common shaft for synchronous rotation with each other,
   reading at least one mark on said first element with at least two reading heads which are angularly spaced from each other,
   displaying the outputs of said heads on an oscilloscope,
   adjusting the position of at least one of said reading heads while observing the outputs thereof so that the responses thereof are uniformly divided from each other, and
   marking said second element with binary markings in response to the passing of said mark on said first element with said reading heads to produce marks on said second element which are an even multiple of the marks on said first element.

6. The method of angularly dividing a disc into a plurality of equal parts comprising the steps of,
   mounting first and second such discs for synchronous rotation with each other,
   reading at least one mark on said first element with two reading heads which are angularly spaced from each other,
   displaying said readings on an oscilloscope,
   adjusting the time base of said oscilloscope so that the traces thereof are keyed alternately by said reading heads with each trace of a length to include two outputs of the same head so that alternate pulses of each reading head fall between the end pulses,
   adjusting at least one of said reading heads while observing the outputs thereof until said alternate pulses coalesce, and
   marking said second element with a recording head with binary markings in response to the passing of said mark on said first element with said reading heads to produce marks on said second element which are an even multiple of the marks on said first element.

7. The method of reducing spatial errors in a binary series of markings on a first member representing discrete angular positions about an axis comprising the steps of,
   rotating said first member about its axis,
   picking up the binary markings as said member is rotated with a pair of reading heads and visually observing an indication of said markings,
   adjusting at least one of said heads while observing said markings for equalizing the observed difference in the spacing between said markings, and
   marking a second member rotated in synchronism with said first member in accordance with the coincidence of said binary markings of said first member with the adjusted position of said reading heads producing binary markings on said second member which are substantially free of the spatial errors in said first member.

8. The method of reducing spatial errors in size and angular spacing of a binary series of markings on a first member representing discrete angular positions about an axis comprising the steps of, rotating said first member about its axis, picking up the binary markings as said member is rotated with a pair of reading heads and visually observing an indication of said markings on an oscilloscope, adjusting at least one of said heads while observing only the difference between said markings due to said errors until the observed difference in the spacing between said markings appears to be equalized, and marking a second member rotated in synchronism with said first member in accordance with the coincidence of said binary markings of said first member with the adjusted position of said reading heads producing binary markings on said second member which are substantially free of the spatial errors in said first member.

9. The method of reducing errors in bit sizes and spacing in a binary series of markings on a first member representing discrete angular positions about an axis, comprising the steps of, rotating said first member about its axis, electrically picking up at angularly spaced discrete positions the binary markings as said first member is rotated and visually observing said markings by displaying on an oscilloscope, the sweep of which is alternately triggered first by the marks at one of said pickup positions and then by the other, adjusting the effective position of at least one of said pickup positions angularly to effect the coalescing of the pulses next following the initiating pulses of the sweeps, and marking a second member rotated in synchronism with said first member in accordance with the coincidence of said markings with said adjusted pickup positions to produce binary markings on said second element which are substantially free of the errors of the markings in said first element.

10. The method of reducing errors in bit sizes and spacing in a binary series of markings on a first disc representing discrete angular positions about the disc, comprising the steps of, rotating said first disc about its axis, picking up on a pair of reading heads the binary markings as said first disc is rotated and visually observing said markings by displaying the outputs of said reading heads on an oscilloscope, the sweep of which is alternately triggered first by one of the reading heads and then by the other, adjusting at least one of said reading heads angularly to effect the coalescing of the pulses next following the initiating pulse of the sweep, and marking a second disc rotated in synchronism with said first disc in accordance with the coincidence of said markings with the adjusted position of said reading heads to produce binary markings on said second disc which are substantially free of the size and spatial errors of the markings in said first disc.

11. The method of reducing errors in the size and spacing of a finely divided series of binary markings on a member representing discrete angular positions about the axis thereof comprising the steps of, rotating said member about its axis, projecting a group of the binary markings thereon as said member is rotated with a pair of reading heads scanning at angularly spaced positions with respect to said axis and projecting at least two of said markings from each of said heads onto a mask having formed therein light transmitting openings essentially equal to the projected size of said binary markings, forming electric signals corresponding to the light passing through each of said masks, comparing the electric signals and adjusting at least one of said reading heads so that the phases of said signals are substantially equal, and marking a new member rotated in synchronism with said first member in accordance with the outputs of said reading heads to produce binary markings on said second member which form an average of the size and spacing of the observed markings on said first member.

12. The method of reducing errors in the size and spacing of a finely divided series of binary markings on a member representing discrete angular positions about the axis thereof comprising the steps of, rotating said member about its axis, projecting a group of binary markings thereon as said member is rotated from angularly separated positions with a pair of reading heads onto masks having formed therein alternate light transmitting openings and opaque portions substantially equal to the projected size of said binary markings, forming electric signals corresponding to the light passing through each of said masks, comparing said electric signals on an oscilloscope while adjusting at least one of said reading heads angularly so that the compared signals have a maximum in phase component, and marking a new member rotated in synchronism with said first member in accordance with the common output of said reading heads to produce binary markings on said second member which are an average of the size and spacing of the observed markings on said first member.

13. The method of reducing errors in the size and spacing of a finely divided series of binary markings on a disc representing discrete angular positions about the axis thereof comprising the steps of, rotating said disc about its axis, picking up the binary markings thereon as said member is rotated with a pair of microscope objectives and projecting a plurality of said markings from each of said objectives onto a prepared mask having formed therein light transmitting openings substantially equal to the projected size of said binary markings, forming separate electric signals corresponding to the light passing through each of said masks, comparing the combined electric signals on a cathode ray tube, adjusting at least one of said reading heads angularly so that the compared signals have a maximum in phase component, and marking a new disc rotated in synchronism with said first disc in accordance with the combined output of said reading heads to produce binary markings on said second disc are an average of the size and spacing of the markings on said first disc.

14. The method of forming finely divided binary markings for a shaft angle encoder substantially free of the effects of random vibration comprising the steps of, rotating a high contrast film to be exposed about an axis, exposing each binary bit on said film a plurality of times while rotating said film through a plurality of revolutions, and developing said film to a high gamma to eliminate edge blur due to random vibration.

15. The method of forming finely divided binary markings on a film substantially free of the effects of random vibration comprising the steps of, rotating a film to be exposed about an axis,
exposing each binary bit on said film once in each revolution thereof while rotating said film through a plurality of revolutions so that each bit location thereon has been exposed a plurality of times, and
developing said film to a high gamma to eliminate edge blur due to random vibration.

16. Apparatus for dividing a disc comprising a spindle,
means mounting said spindle for rotation about an axis,
means on said spindle for supporting a processed disc and a recording disc in planes which are perpendicular to the spindle axis,
means for rotating said spindle,
at least two reading heads each positioned to observe different discrete angularly separated portions of said processed disc and to form electric signals corresponding to the markings thereon,
means mounting at least one of said heads for adjusting movement angularly with respect to said processed disc,
an electric controllable recording head positioned to effect binary markings on said recording disc, and
circuit means controlled by the signals from each of said reading heads for controlling said recording head to produce on said recording disc in response to the rotation of said spindle markings which represent a division of the markings on said processed disc.

17. Apparatus for dividing a plate into a plurality of equally spaced binary markings comprising a spindle,
means mounting said spindle for rotation about an axis,
means adjacent each end of said spindle for supporting a processed plate and a photographic plate in planes which are perpendicular to the spindle axis,
means for rotating said spindle,
a pair of reading heads each positioned to scan different discrete angularly separated portions of said processed plate,
a photoelectric transducer for each of said heads responsive to movement of binary markings on said processed plate past said heads for producing a characteristic electric signal thereof,
a recording head including light modulating means positioned to record on said photographic plate, and
circuit means controlled by each of said reading heads for controlling said recording head to produce on said photographic plate in response to the rotation of said spindle binary markings which represent a division of the markings on said processed plate.

18. Apparatus for dividing a plate comprising a spindle,
means mounting said spindle for rotation about an axis,
means on said spindle for supporting a pair of photographic plates in planes which are perpendicular to the spindle axis,
means for rotating said spindle,
a pair of reading heads each including optical-to-electric transducers and each positioned to observe different discrete angularly separated portions of one of said plates,
means mounting at least one of said heads for adjusting movement angularly with respect to said one plate,
a recording head including a controllable light source positioned to direct a recording light on the other of said plates, and
circuit means controlled by each of said reading heads for controlling said light source to produce on said other plate in response to the rotation of said spindle markings which represent a two power division of the markings on said one plate.

19. Apparatus for angularly dividing a disc into binary parts comprising a spindle,
means mounting said spindle for rotation about an axis,
means on said spindle for supporting a pair of photographic plates in spaced apart relation in planes which are perpendicular to the spindle axis,
means for rotating said spindle and plates,
a pair of reading heads each positioned to observe different discrete angularly separated portions of one of said plates and forming an electric signal of markings thereon,
a recording head including a controllable light source positioned to project a modulated light for recording binary marks on the other of said plates,
means mounting said recording head for adjustment radially of said other plate, and
circuit means controlled by each of said reading heads for modulating said light source to produce on said other plate in response to the rotation of said spindle binary markings which represent a two power division of the markings on said first plate.

20. The method of finely dividing an annular member into a large number of $2^n$ equal parts forming discrete bits, and wherein intermediate annular members are used in the making of said ultimate annular member comprising the steps of
(1) forming a single mark on a first annular member;
(2) making a $2^1$ annular member from said first annular member according to the method of claim 1;
(3) making a corrected $2^1$ annular member by reading from said $2^1$ annular member and compensating for error in the placement of the bit thereon;
(4) making a $2^2$ annular member from said corrected $2^1$ annular member by repeating step 2 while utilizing said corrected $2^1$ annular member in place of said annular member having a single mark;
(5) similarly making a corrected $2^2$ annular member according to the same compensation step as used in making said corrected $2^1$ annular member;
(6) proceeding to make further annular members and corresponding corrected annular members by repeating steps 2 and 3 to produce a $2^x$ annular member; wherein the exponent $x$ is less than $n$;
(7) making a corrected $2^x$ annular member by averaging the error in spacing and size on said $2^x$ member and making a corrected member $2^x$ in accordance with the average bit size on said first $2^x$ member; and
(8) making a $2^n$ annular member by repeating step 2 and using said $2^x$ annular member.

References Cited by the Examiner

UNITED STATES PATENTS

| | | | |
|---|---|---|---|
| 2,839,960 | 6/1958 | Jones | 346—107 |
| 3,008,372 | 11/1961 | Willey et al. | 346—107 |
| 3,040,322 | 6/1962 | Mahaney et al. | 346—107 |
| 3,122,735 | 2/1964 | Townsend | 340—347 |

OTHER REFERENCES

Pages 107–109, April 1956, Digits and Optics Team For Precision, by E. M. Jones, Control Engineering.

Page 85, December 1961, Optical Displacement Measuring Device, by J. J. Hamrick et al., IBM Technical Disclosure Bulletin, vol. 4, No. 7.

MAYNARD R. WILBUR, *Primary Examiner.*

DARYL W. COOK, *Examiner.*

W. J. KOPACZ, *Assistant Examiner.*